UNITED STATES PATENT OFFICE.

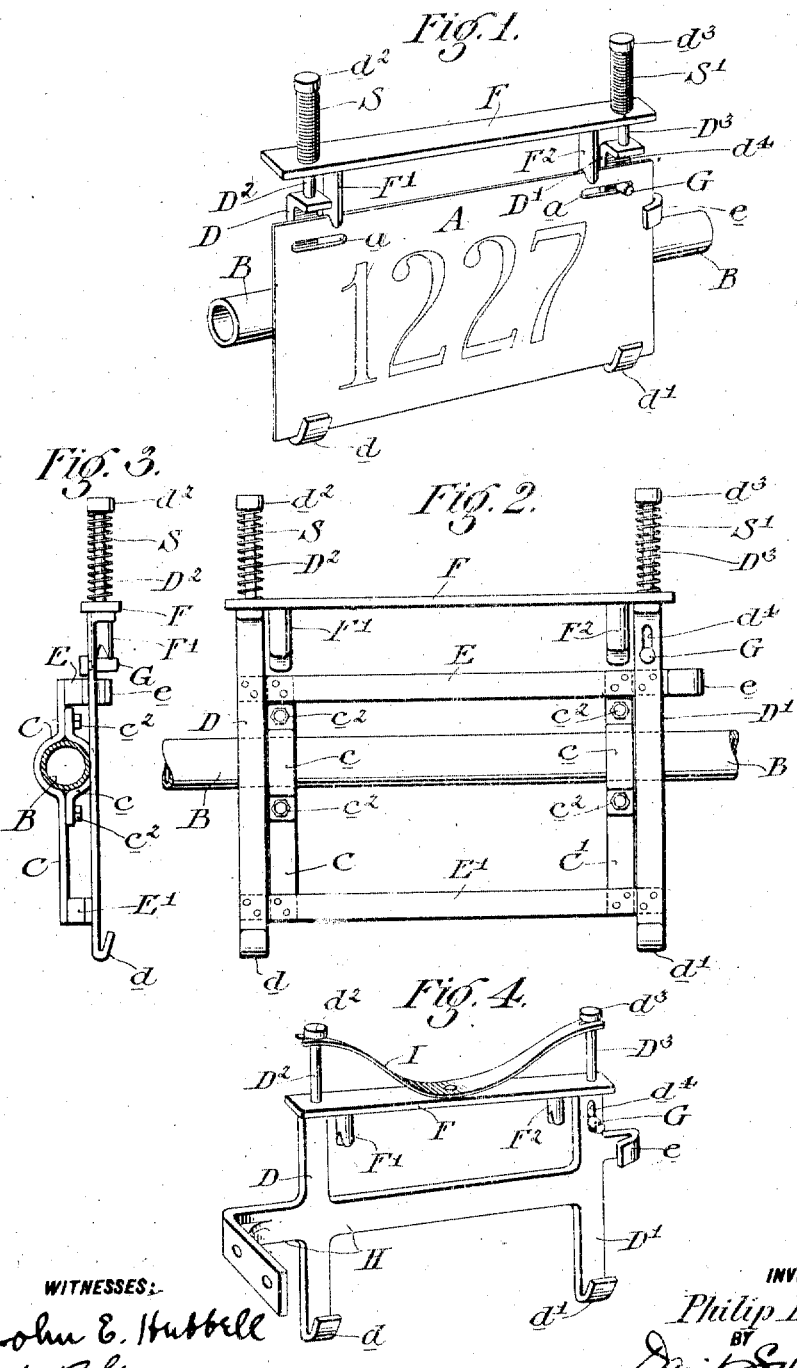

PHILIP HAUCK, OF ELKINS PARK, PENNSYLVANIA.

LICENSE-TAG HOLDER FOR VEHICLES.

994,464.   Specification of Letters Patent.   Patented June 6, 1911.

Application filed April 15, 1909. Serial No. 490,031.

*To all whom it may concern:*

Be it known that I, PHILIP HAUCK, a citizen of the United States, residing at Elkins Park, in the county of Montgomery and State of Pennsylvania, have invented certain new and useful Improvements in License-Tag Holders for Vehicles, of which the following is a specification.

The present invention relates to a device for attaching license tags, and particularly to license tags used in connection with automobiles and other vehicles.

The object of the invention is to provide a device by means of which a license tag may be secured in place upon an automobile or other vehicle and readily detached for the insertion of other license tags when the vehicle is traveling from one State or division of the country to another.

My invention embodies a simple and inexpensive device adapted to holding license tags of varying dimensions and is so constructed as to require no readjustment in changing from a tag of small dimensions to a larger one or vice versa.

In the accompanying drawings:—Figure 1 is a perspective view of a license tag embodying my improvements; Fig. 2 is a front elevation of the same with the license tag removed; Fig. 3 is an end view, and Fig. 4 is a front elevation of a modified form of my invention.

A, is the license tag, comprising a rectangular plate of metal provided with the license number and with slotted openings $a$ $a$, to receive straps commonly employed in securing the license tag to the frame of the vehicle.

B, is a stay-rod forming part of the vehicle from which it is customary to support the license tag.

The device forming the subject matter of my invention comprises a frame formed of side bars C, C', and D, D', united together by cross-pieces E, and E', the whole being securely fastened to the stay-rod B.

For convenience of attachment the side bars C and C' are provided with straps C and C' which pass around the stay-rod B, and are secured to the side bars by means of bolts $C^2$, $C^3$, etc.

The lowermost ends of the side bars D and D' are bent upward to form V shaped hooks, $d$ and $d'$ to receive the lower edge of the license tag and in like manner the cross-piece E is bent over as shown at $e$ to engage the side of the license tag.

The parts thus described form the fixed parts of a frame or support which is securely fastened to a portion of the frame of the vehicle.

The side bars D and $D^1$ are provided with upwardly projecting stems $D^2$ and $D^3$, which serve as guides to a movable plate F, and as supports to spiral springs S and $S^1$ which latter are interposed between the plate and collars $d^2$ and $d^3$ secured to the stems.

The movable plate F, is provided with downwardly projecting pins $F^1$ and $F^2$ having V shaped ends slotted to receive the upper edge of the license tag.

The side bar $D^1$, is provided with an elongated slot $d^4$, in which a pin G, adapted to one of the openings $a$ of the license tag is free to move in a vertical plane described by the slot $D^4$. The pin G, is so mounted as to move freely in the slot $D^4$, of the side bar $D^1$, the headed ends of the pin preventing the same from becoming disengaged from the slot.

In the modification shown in Fig. 4, the side bars C and $C^1$ have been omitted as also have the cross-pieces E and $E^1$. In lieu of these supporting members the side bars D and $D^1$ are connected to or from an integral part of a bracket H, which may be secured to any convenient portion of the vehicle.

It will also be understood that a curved leaf spring as indicated at I in Fig. 4, may be employed in lieu of the spiral springs S and $S^1$ shown and described in connection with Figs. 1, 2 and 3.

In attaching the license tag to its support no adjustment of the parts is necessary. All that is required is to place the lower edge of the tag in the hooks D and $D^1$ and raise the bar F and press the upper edge of the tag into engagement with the slots in the pins $F^1$ and $F^2$. Before releasing the bar F, a slight movement is given to the tag to bring the right hand corner into engagement with the hook $e$, and one of the openings A with the pin G, after so doing the bar F may be released and the license tag will be firmly secured in place.

Having now described my invention what I claim and desire to secure by Letters Patent is:—

1. A license-tag holder for vehicles comprising a frame the lower part of which is provided with projections to support a tag, means for securing the frame to a vehicle, a fixed projection arranged upon the side of the frame, a vertically movable pin guided in a slot in the frame and adapted to a slotted opening in the tag and a spring pressed plate having projections adapted to engage and hold the upper edge of the tag.

2. A license tag holder for vehicles comprising a frame the lower part of which is provided with hooks to support a tag, means for securing the frame to a vehicle, a hook arranged at the side of the frame to arrest lateral movement of the tag in one direction, a pin located adjacent to said hook and adapted to a recess in the tag to arrest lateral movement in the opposite direction, a plate mounted above the frame having grooved projections adapted to engage the upper part of the tag and means to cause said projections to bear upon the tag with yielding pressure.

3. A license tag holder for vehicles comprising side bars and cross bars constituting a frame, hooks formed upon one of the cross bars to arrest lateral movement of the tag in one direction, a movable pin guided in one of the side bars and adapted to a slot in the tag to arrest lateral movement in the opposite direction, a plate guided above the frame and provided with slotted projections to embrace the upper edge of the tag, and springs suitably arranged to cause the projections to bear upon the tag with yielding pressure.

In testimony whereof I affix my signature in presence of two witnesses.

PHILIP HAUCK.

Witnesses:
ANNIE SCHUCLE,
H. MUHLSCHLEGEL.